United States Patent
Lee

(10) Patent No.: US 9,109,463 B2
(45) Date of Patent: Aug. 18, 2015

(54) LOAD SUPPORTING STRUCTURE OF ELECTRIC BOOSTER TYPE BRAKE APPARATUS

(71) Applicant: HYUNDAI MOBIS CO., LTD., Seoul (KR)

(72) Inventor: Sang Mok Lee, Yongin-si (KR)

(73) Assignee: Hyundai Mobis Co., Ltd. (KR)

( * ) Notice: Subject to any disclaimer, the term of this patent is extended or adjusted under 35 U.S.C. 154(b) by 325 days.

(21) Appl. No.: 13/787,642

(22) Filed: Mar. 6, 2013

(65) Prior Publication Data

US 2014/0147267 A1   May 29, 2014

(30) Foreign Application Priority Data

Nov. 28, 2012   (KR) .................. 10-2012-0136007

(51) Int. Cl.
| | |
|---|---|
| *F15B 7/08* | (2006.01) |
| *F01D 25/16* | (2006.01) |
| *B60T 13/68* | (2006.01) |
| *B60T 13/74* | (2006.01) |
| *B60T 17/18* | (2006.01) |

(52) U.S. Cl.
CPC ............ *F01D 25/162* (2013.01); *B60T 13/686* (2013.01); *B60T 13/745* (2013.01); *B60T 17/18* (2013.01)

(58) Field of Classification Search
CPC .............................. B60T 13/745; F01D 25/162
USPC ............................................................. 60/545
See application file for complete search history.

(56) References Cited

U.S. PATENT DOCUMENTS

| | | | |
|---|---|---|---|
| 2009/0217659 A1* | 9/2009 | Ohno et al. ................ | 60/545 |
| 2010/0242469 A1 | 9/2010 | Jungbecker et al. | |

FOREIGN PATENT DOCUMENTS

| | | |
|---|---|---|
| JP | 5055336 B2 | 10/2012 |
| KR | 2010-0098847 A | 9/2010 |

* cited by examiner

*Primary Examiner* — Michael Leslie
(74) *Attorney, Agent, or Firm* — Knobbe, Martens, Olson & Bear LLP

(57) ABSTRACT

A load supporting structure of an electric booster type brake apparatus, includes: a housing including a rear housing member and a front housing member so as to define a receiving space therein; a ball screw shaft rotatably installed in the receiving space of the housing; a rotor installed at one side of the ball screw shaft so as to transmit torque; a first bearing installed between the rear housing member and one side of the rotor and configured to support a radial direction load due to a hydraulic reaction force; and a second bearing installed between the front housing member and the other side of the rotor and configured to support an axial direction load due to a hydraulic reaction force. Therefore, the number of components and the thickness of the housing are reduced, and therefore weight reduction of the electric booster type brake apparatus may be implemented.

4 Claims, 11 Drawing Sheets

- PRIOR ART -

- PRIOR ART -

- PRIOR ART -

FIG. 8  - PRIOR ART -

LOAD SUPPORTING STRUCTURE OF ELECTRIC BOOSTER TYPE BRAKE APPARATUS

CROSS-REFERENCE TO RELATED APPLICATIONS

This application claims priority to and the benefit of Korean Patent Application No. 10-2012-0136007 filed in the Korean Intellectual Property Office on Nov. 28, 2012, the entire contents of which are incorporated herein by reference.

TECHNICAL FIELD

The present disclosure relates to a load supporting structure of an electric booster type brake apparatus.

RELATED TECHNOLOGY

In general, an electric booster type brake apparatus generates a front wheel brake pressure by driving a motor, generates a rear wheel brake pressure using a pedal effort, and implements mutual cooperative control.

To do this, the electric booster type brake apparatus has a motor controlled by an electronic control unit (ECU) which recognizes a pedal stroke, and a front wheel master cylinder that is supplied with oil from an oil reservoir, for generating the front wheel brake pressure. The electric booster type brake apparatus has a rear wheel master cylinder that is supplied with oil from the oil reservoir by the pedal effort, for generating the rear wheel brake pressure.

The electric booster type brake apparatus typically has a pedal simulator that provides a reaction force according to the pedal stroke to the pedal so as to allow the pedal effort to be sensed.

A fail-safe function implemented by the electric booster type brake apparatus as described above typically performs a brake operation when an electric booster is failed, by applying multiple solenoid valves and supplying a hydraulic pressure flow to the master cylinder that generates a hydraulic pressure using the solenoid valves by the pedal.

In more detail, referring to FIGS. 1 to 3, the electric booster type brake apparatus includes a motor 10 and a master cylinder (M/C) 20 for generating the front/rear wheel brake pressures, a sub master cylinder (sub M/C) 30 for the fail-safe function, a pedal simulator 40 for generating a pedal effort of a driver, two solenoid valves 50 including a first valve 51 and a second valve 52 for opening and closing flow paths, and the electronic control unit (ECU) for controlling a pedal stroke sensor and the motor.

Referring to FIGS. 2 and 3, in an operation state of the electric booster type brake apparatus, the first valve 51 is opened and the second valve 52 is closed when a driver steps on a brake pedal. The pedal effort sensed by the driver is generated by a reaction force that is generated when a rubber and a spring of the pedal simulator 40 are compressed.

Therefore, as illustrated in FIG. 3, the motor 10 rotates a ball screw 60 to move a piston 70 forward, and pressure generated at this time forms brake pressure in the master cylinder 20.

FIG. 4 is a view illustrating a load supporting structure of a motor of an electric booster type brake apparatus in the related art.

Referring to FIG. 4, a rotor 11 and a torque connector 12 of the motor 10, and the torque connector 12 and a ball screw shaft 13, are formed in a spline type or in a hexagon shape, respectively, to transmit torque between the components, and are coupled by being fitted to each other.

A protrusion 15 of a ball screw nut 14 is installed to be slidable with respect to a screw guide 16. Therefore, the ball screw nut 14 moves forward to press the piston 70 when the motor 10 rotates.

Therefore, a first bearing 17 installed on the rotor 11 supports a radial direction load, and a second bearing 18 supports the radial direction load and an axial direction load at the same time.

FIG. 5 is a view illustrating an influence of a hydraulic reaction force of the master cylinder 20 on the load supporting structure of the electric booster type brake apparatus, when the electric booster type brake apparatus is operated. In FIGS. 3 and 5, the arrows ①, ②, ③, ④ illustrate influence of the hydraulic reaction force of the master cylinder 20 on the load supporting structure of the electric booster type brake apparatus.

In more detail, as illustrated in FIG. 5, the hydraulic reaction force is transmitted to the ball screw nut 14 that supports the piston 70, and sequentially a load is applied to the ball screw shaft 13 coupled to the ball screw nut 14.

The load transmitted to the rotor 11 through the torque connector 12 that is installed to support the ball screw shaft 13 is finally supported by a rear housing member 19-1 of the motor 10 via the second bearing 18. Here, as illustrated in FIG. 6, the rear housing member 19-1 is assembled and fastened to a front housing member 19-2 with a bolt so as to form a housing 19 having a receiving space therein.

However, in a load supporting structure 2 of the electric booster type brake apparatus in the related art, because the rear housing member 19-1 supports the second bearing 18 that supports not only the radial direction load but the axial direction load, there is a problem in that the rear housing member 19-1 and the front housing member 19-2 need to be designed to have a large thickness in order to secure rigidity of the rear housing member 19-1 and the front housing member 19-2, as illustrated in FIG.

This design causes a weight increase when manufacturing a product according to the load supporting structure 2 of the electric booster type brake apparatus, a decrease in fuel efficiency of vehicles due to the weight increase, and an increase in manufacturing costs.

Because the load supporting structure 2 of the electric booster type brake apparatus in the related art uses the torque connector 12, a diameter of the rotor 11 needs to be large at the position where the rotor 11 is coupled to the second bearing 18, as illustrated in FIG. 8. The second bearing 18 supports not only the radial direction load but the axial direction load and thus needs to have a high specification. As a result, in the load supporting structure 2 of the electric booster type brake apparatus in the related art, the second bearing 18 having a high specification and a large size is used, thereby causing an increase in manufacturing costs.

Although the first bearing 17 supports only the radial direction load in the motor 10 and thus needs to have a substantially small size, there is a problem in that the bearing having a higher specification than requirement specifications needs to be chosen because the bearing having a size corresponding to an outer diameter of the rotor 11 needs to be used.

SUMMARY

An aspect of the present invention has been made in an effort to provide a new load supporting structure of an electric booster type brake apparatus, capable of reducing a thickness of a housing of the electric booster type brake apparatus and reducing a specification of a bearing by changing a disposition or the like of a rotor supporting bearing installed in the electric booster type brake apparatus.

An exemplary embodiment of the present invention provides a load supporting structure of an electric booster type brake apparatus, including: a housing including a rear housing member and a front housing member so as to have a receiving space therein; a ball screw shaft rotatably installed in the receiving space of the housing; a rotor installed at one side of the ball screw shaft so as to transmit torque; a first bearing installed between the rear housing member and one side of the rotor and configured to support a radial direction load due to a hydraulic reaction force; and a second bearing installed between the front housing member and the other side of the rotor and configured to support an axial direction load due to a hydraulic reaction force.

One side of the rotor, which is bent in an axial direction, and the other side of the rotor, which is bent in a direction opposite to the direction in which the one side is bent, may be supported by the first bearing and the second bearing, respectively.

The first bearing may be installed so that the radial direction load is applied to the rear housing member, and the second bearing may be installed so that the axial direction load is applied to the front housing member.

Here, the front housing member may include an axial load supporting portion installed to have a thickness corresponding to the axial direction load supported by the second bearing.

A diameter of the first bearing may be smaller than a diameter of the second bearing.

In the load supporting structure of the electric booster type brake apparatus having the aforementioned configuration according to the exemplary embodiment of the present invention, the torque connector in the related art is removed, and a position of the bearing which supports the hydraulic reaction force is changed accordingly, thereby reducing the thickness of the housing. As a result, the number of components and the thickness of the housing are reduced, and therefore weight reduction of the electric booster type brake apparatus may be implemented and manufacturing costs may be reduced.

As the disposition of the bearing which supports the hydraulic reaction force is changed, it is possible to use a bearing which meets an actual requirement specification of the load supporting structure of the electric booster type brake apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
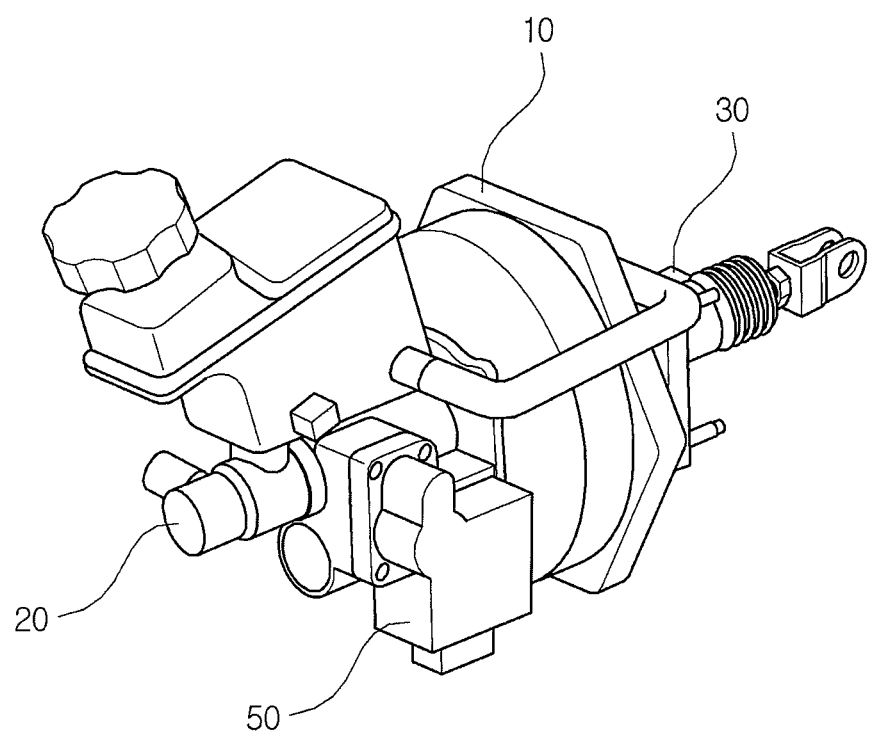
FIG. 1 is a perspective view illustrating an electric booster type brake apparatus.
Figure 2:
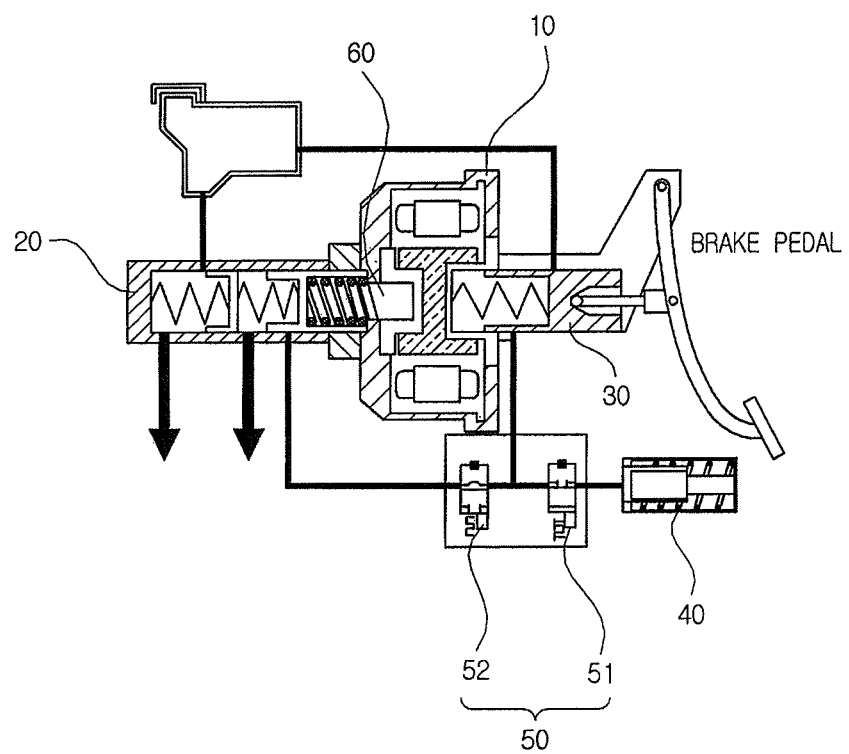
FIG. 2 is a view illustrating a brake system of an electric booster type brake apparatus in the related art.
Figure 3:
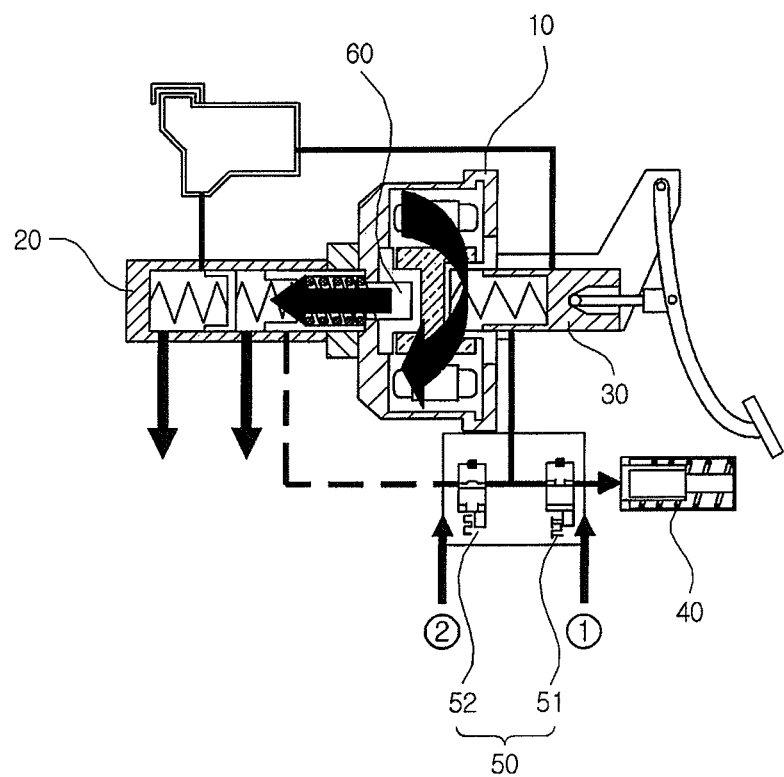
FIG. 3 is a view illustrating a process in which brake pressure is generated in the electric booster type brake apparatus in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of embodiments the present invention throughout the several figures of the drawing.

DETAILED DESCRIPTION

Hereinafter, the exemplary embodiments of the present invention will be described in detail with reference to the accompanying drawings in order to clarify the solution to the technical problems of the present invention. However, to clearly describe the present invention, a description of the related art, which makes the subject matter of the present invention ambiguous, will be omitted. The terms described below are defined in consideration of each function in the present invention, and may be changed in accordance with the intention or the practice of a designer or a manufacturer. Therefore, the definition of the terms should be determined based on the contents disclosed in the entire specification. The elements denoted by the same reference numerals (drawing numbers) are the same elements through the specification.

Hereinafter, a load supporting structure 1 of an electric booster type brake apparatus according to an exemplary embodiment of the present invention will be described.

Figure 9:
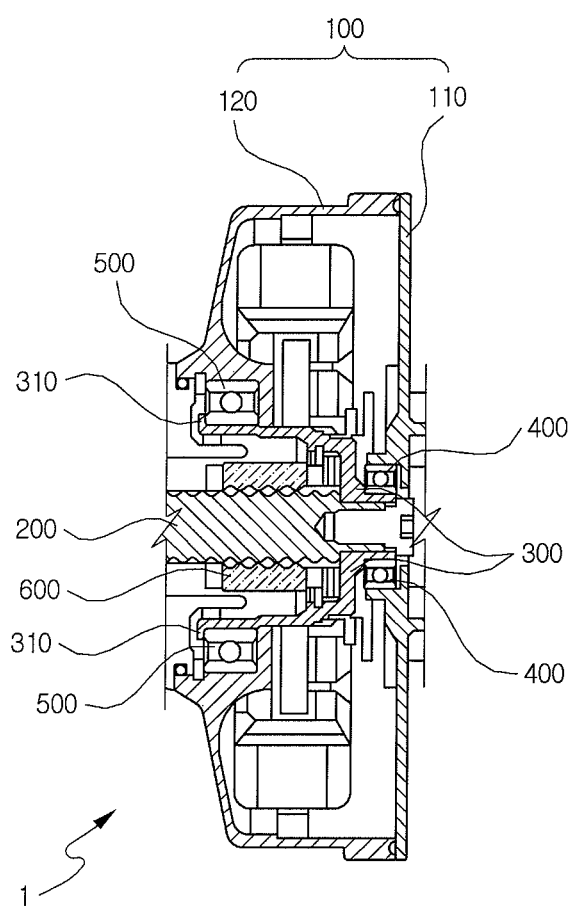
FIG. 9 is a view illustrating a load supporting structure of an electric booster type brake apparatus according to an exemplary embodiment of the present invention.

FIG. 9 is a view illustrating the load supporting structure 1 of the electric booster type brake apparatus according to an exemplary embodiment of the present invention. In more detail, FIG. 9 relates to a load supporting structure of the above-described electric booster type brake apparatus, which relates to a motor.

Referring to FIG. 9, the load supporting structure 1 of the electric booster type brake apparatus according to an exemplary embodiment of the present invention may include a housing 100 including a rear housing member 110 and a front housing member 120 so as to have a receiving space therein, a ball screw shaft 200, a rotor 300, a first bearing 400, a second bearing 500, and a ball screw nut 600.

Figure 6:
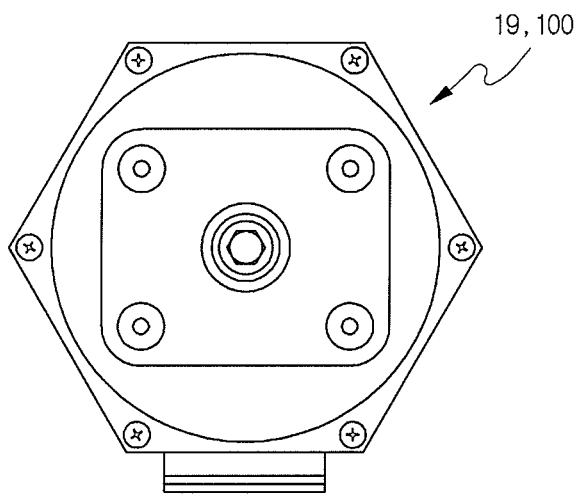
FIG. 6 is a view illustrating a state in which a front housing member and a rear housing member are coupled in the electric booster type brake apparatus.

Referring to FIGS. 6 and 9, the housing 100 is formed by assembling and fastening the rear housing member 110 and the front housing member 120 with a bolt or the like, and therefore the receiving space is formed in the housing 100.

The ball screw shaft 200 is rotatably installed in the receiving space of the housing 100. As described above, the ball screw nut 600 moves forward when the motor rotates, and then the ball screw shaft 200 presses the aforementioned piston.

Torque generated by the rotor 300 is directly transmitted to the ball screw shaft 200. Here, the rotor 300 and the ball screw shaft 200 may be formed in a spline type or in a hexagon shape, respectively, to transmit torque, and may be coupled by being fitted to each other. Here, the spline type refers to a feature that is formed by directly cutting keys in multiple lines on the shaft in order to allow the shaft to slip.

Figure 4:
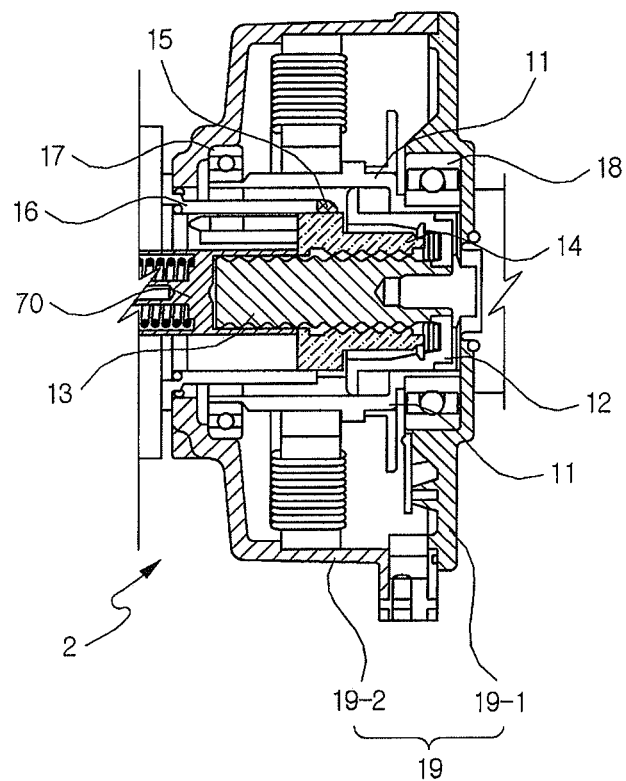
FIG. 4 is a view illustrating a load supporting structure of a motor of the electric booster type brake apparatus in the related art.
Figure 5:
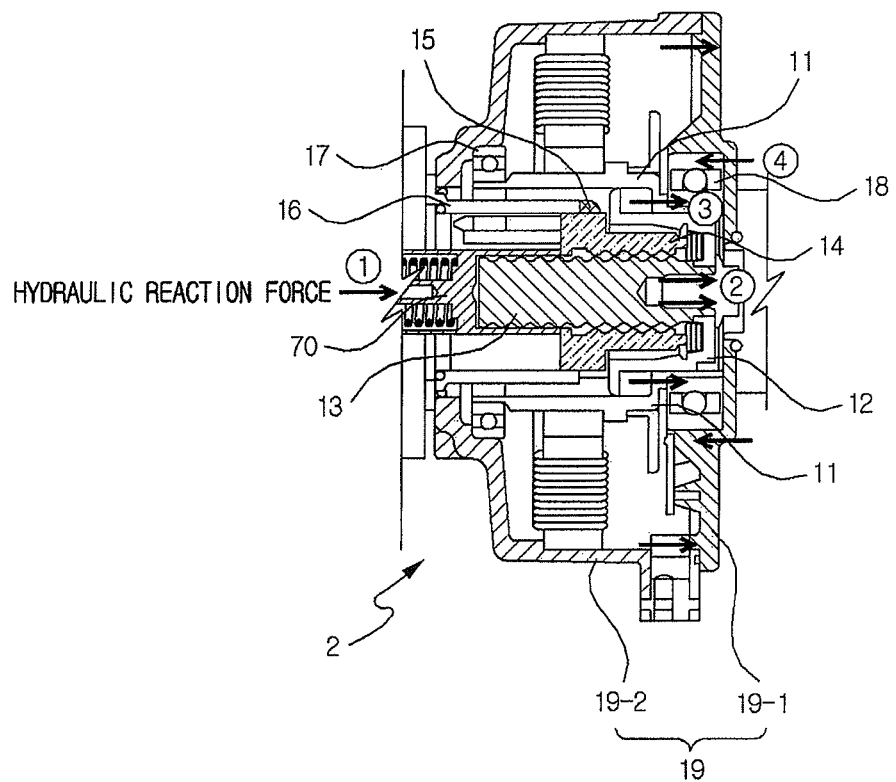
FIG. 5 is a view illustrating an influence of a hydraulic reaction force of a master cylinder on the load supporting structure of the electric booster type brake apparatus, when the electric booster type brake apparatus in the related art is operated.

Therefore, referring to FIG. 4, the load supporting structure 1 of the electric booster type brake apparatus according to the exemplary embodiment of the present invention does not have the torque connector 12 which exists in the load supporting structure 2 of the electric booster type brake apparatus in the related art, which is installed between the ball screw shaft 200 and the rotor 300, in comparison with the aforementioned load supporting structure 2 of the electric booster type brake apparatus in the related art. That is, because the load supporting structure 1 of the electric booster type brake apparatus according to the exemplary embodiment of the present invention does not have the torque connector, manufacturing costs thereof may be reduced.

However, because a gap may be generated between the ball screw shaft 200 and the rotor 300 while being fitted to each other, the load supporting structure 1 of the electric booster type brake apparatus according to the exemplary embodiment of the present invention, of course, may compensate for the deviation caused by coaxiality.

Hereinafter, a longitudinal direction of the ball screw shaft 200 is referred to as 'an axial direction', and a direction vertical to the axial direction is referred to as 'a radial direction'.

Figure 10:
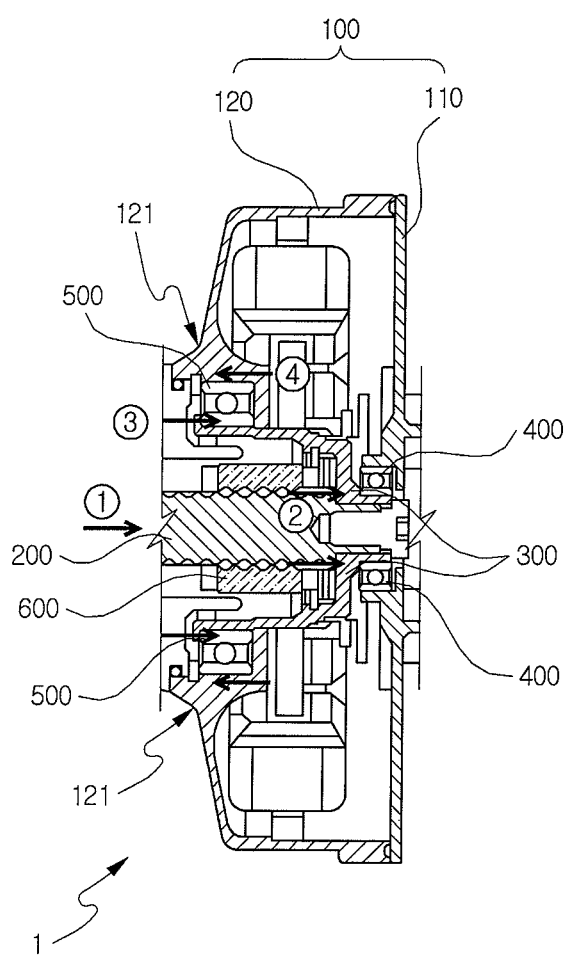
FIG. 10 is a view illustrating an influence of a hydraulic reaction force on the load supporting structure of the electric booster type brake apparatus according to the exemplary embodiment of the present invention.

Referring to FIGS. 9 to 10, the first bearing 400 is installed between the rear housing member 110 and one side of the rotor 300, and supports a radial direction load generated due to a hydraulic reaction force. Here, the arrows ①, ②, ③, ④ of FIG. 10 illustrate influence of a hydraulic reaction force generated due to main brake pressure, when the electric booster type brake apparatus is operated, on the load supporting structure 1 of the electric booster type brake apparatus according to the exemplary embodiment of the present invention.

Because the first bearing 400 is installed between the rear housing member 110 and one side of the rotor 300, the radial direction load applied to the first bearing 400 is supported by the rear housing member 110.

In more detail, referring to FIG. 10, the hydraulic reaction force causes a load to be applied to the ball screw shaft 200, and the load is transmitted to the rotor 300, which is coupled to the ball screw shaft 200 in a manner of spline or the like for transmitting torque. The load is finally supported by the rear housing member 110 via the first bearing 400.

Figure 11:
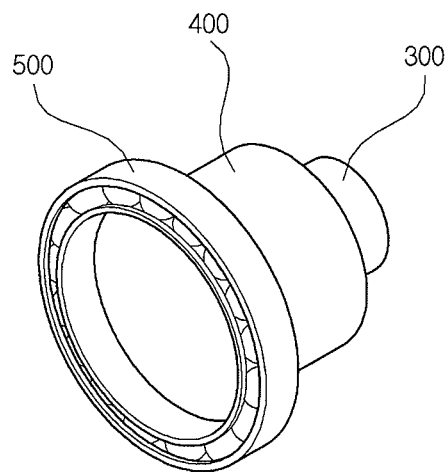
FIG. 11 is a perspective view illustrating a coupling relationship between a rotor, a first bearing, and a second bearing in the electric booster type brake apparatus according to the exemplary embodiment of the present invention.

As illustrated in FIGS. 9 to 11, the second bearing 500 is installed between the front housing member 120 and the other side of the rotor 300, and supports an axial direction load generated due to the hydraulic reaction force. Because the second bearing 500 is installed between the front housing member 120 and the other side of the rotor 300, the axial direction load applied to the second bearing 500 is supported by the front housing member 120.

In more detail, referring to FIG. 10, the hydraulic reaction force causes a load to be applied to the ball screw shaft 200, and the load is transmitted to the rotor 300, which is coupled to the ball screw shaft 200 in a manner of spline or the like for transmitting torque. The load is finally supported by the front housing member 120 via the second bearing 500.

Here, as illustrated in FIGS. 9 to 11, the rotor 300 is formed to have one side of the rotor 300 bent in the axial direction, and the other side of the rotor 300 which is bent in a direction opposite to the direction in which the one side is bent.

As illustrated in FIGS. 9 and 10, the other side of the rotor 300, which is supported by the second bearing 500, may further include a vertical protrusion 310 so that the axial direction load may be easily applied to the second bearing 500.

Meanwhile, as illustrated in FIGS. 9 and 10, the front housing member 120 of the load supporting structure 1 of the electric booster type brake apparatus according to the exemplary embodiment of the present invention may include an axial load supporting portion 121 installed to have a predetermined thickness corresponding to the axial direction load.

Figure 7:
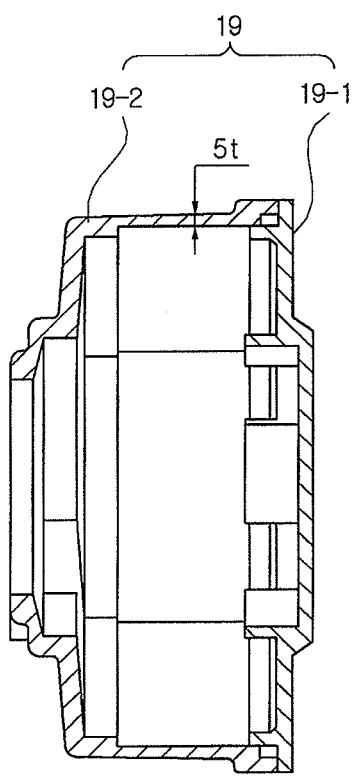
FIG. 7 is a cross-sectional view illustrating a cross section of a housing of the electric booster type brake apparatus in the related art.
Figure 8:
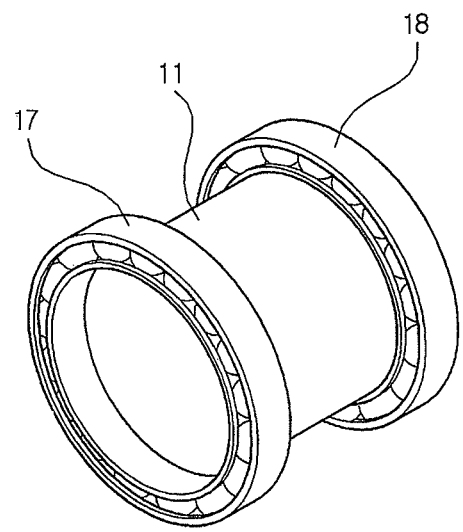
FIG. 8 is a perspective view illustrating a coupling relationship between a rotor, a first bearing, and a second bearing in the electric booster type brake apparatus in the related art.

Therefore, when a high axial load is generated, the high axial load does not have an influence on the rigidity of the front housing member 120 in an area other than in the area of the axial load supporting portion 121 of the front housing member 120. Accordingly, a thickness of the housing 100, except for the axial load supporting portion 121, may be further reduced compared to the load supporting structure 2 of the electric booster type brake apparatus in the related art, as illustrated in FIG. 7.

Therefore, in the load supporting structure 1 of the electric booster type brake apparatus according to the exemplary embodiment of the present invention, because the second bearing 500 finally supports an axial load and the front housing member 120 supports the second bearing 500, cross-sectional thicknesses of the rear housing member 110 and the front housing member 120 may be reduced, in comparison with the load supporting structure 2 of the electric booster type brake apparatus in the related art, as illustrated in FIG. 4.

Because the cross-sectional thickness of the rear housing member 110 may be reduced, a size of the first bearing 400 may also be reduced corresponding to the cross-sectional thickness of the rear housing member 110.

Meanwhile, because the load supporting structure 2 of the electric booster type brake apparatus in the related art, as illustrated in FIG. 4, includes the torque connector 12, an outer diameter of the rotor 11, which corresponds to an outer diameter of the torque connector 12, is also greater than an outer diameter of the rotor 300 of the load supporting structure 1 of the electric booster type brake apparatus according to the exemplary embodiment of the present invention. Therefore, the first bearing 17 of the load supporting structure 2 of the electric booster type brake apparatus in the related art, which supports a radial direction load, is required to have an exterior size greater than the size of an actual requirement specification, because of a large diameter of the rotor 11 of the load supporting structure 2 of the electric booster type brake apparatus in the related art.

However, as illustrated in FIG. 11, as the first bearing 400 of the load supporting structure 1 of the electric booster type brake apparatus according to the exemplary embodiment of the present invention, which supports the radial direction load, a bearing, which meets an actual requirement specification, may be used.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A booster apparatus for a vehicle brake system, the apparatus comprising:
    a housing comprising a rear housing member and a front housing member that define a receiving space therein;
    a ball screw shaft at least in part installed in the receiving space of the housing and rotatable about an axial direction;
    a rotor rotatable about the rotational axis and connected to the ball screw shaft for transferring torque of the rotor to the ball screw shaft;
    the rotor comprising a sleeve extending in the axial direction and a flange extending in the radial direction;
    a first bearing installed between the rear housing member and the rotor, wherein the first bearing abuts the sleeve such that a radial direction load applied to the rotor is transferred to the rear housing member via the first bearing; and
    a second bearing installed between the front housing member and the rotor, wherein the second bearing abuts the flange such that an axial direction load applied to the rotor is transferred to the front housing member via the second bearing.

2. The apparatus of claim 1, wherein the front housing member comprises an axial load supporting portion that abuts the second bearing.

3. The apparatus of claim 2, wherein the first bearing has a diameter smaller than that of the second bearing.

4. A vehicle comprising the booster of claim 1.

* * * * *